United States Patent [19]
Crandall

[11] 3,942,572
[45] Mar. 9, 1976

[54] MULTICELLED, TUBELESS SAFETY TIRE WITH AIR ACTIVATED SNOW AND ICE STUDS

[76] Inventor: Azel L. Crandall, c/o George Spector, 3615 Woolworth Bldg., 233 Broadway, New York, N.Y. 10007

[22] Filed: Jan. 15, 1974

[21] Appl. No.: 433,517

[52] U.S. Cl. ............... 152/208; 152/210; 152/339
[51] Int. Cl.² ......................................... B60C 11/14
[58] Field of Search .................. 152/208, 210–212, 152/339, 340, 352, 353, 361 R

[56] References Cited
UNITED STATES PATENTS

| | | | |
|---|---|---|---|
| 2,491,491 | 12/1949 | Freygang | 152/208 |
| 2,708,470 | 5/1955 | Gramelspacher | 152/208 |
| 3,043,356 | 7/1962 | Mayhercy | 152/208 |
| 3,766,956 | 10/1973 | Ruane et al | 152/208 |

FOREIGN PATENTS OR APPLICATIONS 1,017,483  10/1957  Germany ............................ 152/208

*Primary Examiner*—Drayton E. Hoffman

[57] ABSTRACT

An improved automobile tire that incorporates studs for engaging a roadway surface during times when covered by snow and especially by ice; the studs protruding from a narrow area around the tire which during normal use in non-icy weather is concave so to form an annular recess in order that the studs do not engage the roadway; the tire having a separate air cell just behind the annular recess which is inflatable during icy weather by a separate valve so to push outwardly the recess thus exposing the studs beyond the remainder of the tire outer periphery.

3 Claims, 4 Drawing Figures

MULTICELLED, TUBELESS SAFETY TIRE WITH AIR ACTIVATED SNOW AND ICE STUDS

This invention relates generally to ice and snow tires for automotive vehicles.

It is well known that a conventional studded tire presently being marketed has the steel studs mounted in a fixed position within the surface of a conventional shaped tire so that at all times the studs engage a roadway surface. This is, of course, not an ideal construction because during much of the winter season there is no snow or ice upon a roadway surface so that the studs tend to wear out themselves from continual striking the road, and also the roadway surface is subject to greater damage therefrom. This situation is according in want of an improvement.

Therefore, it is a principle object of the present invention to provide an improved tire wherein the studs can engage a roadway surface only at such times when so wished due to icy road surface conditions, thus preventing wear of the studs and roadway surface.

Another object is to provide a safety tire wherein the tire can simply be inflated at a separate valve in order to outwardly extend the studs at such times whenever needed.

Other objects are to provide a safety tire which is simple in design, inexpensive to manufacture, rugged in construction, easy to use and efficient in operation.

These and other objects will become readily apparent upon a study of the following specification and the accompanying drawing wherein.

Figure 1:
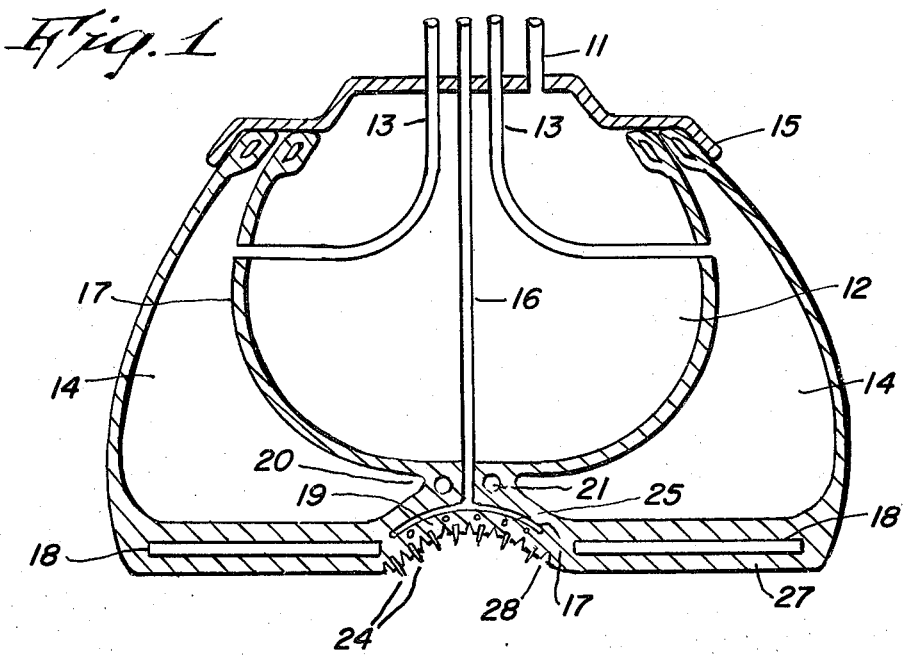
FIG. 1 is a cross section of the tire mounted on a wheel rim and shown with spikes in a retracted position.
Figure 2:
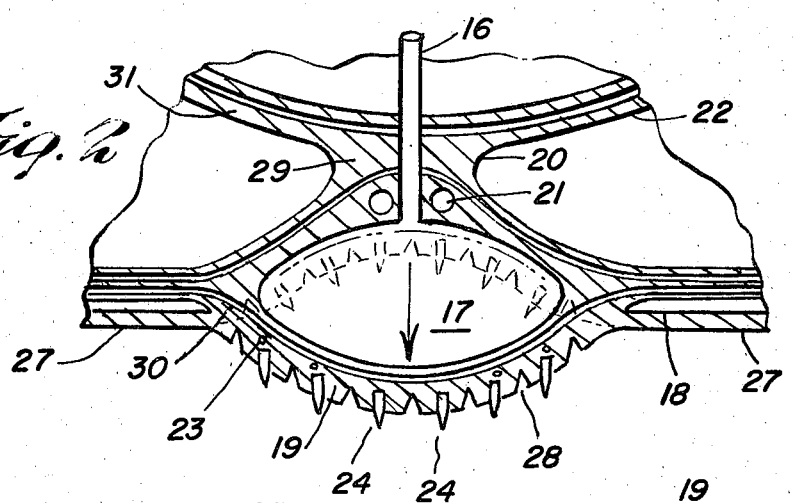
FIG. 2 is an enlarged detail thereof shown with spikes extended outward for use on ice.
Figure 3:
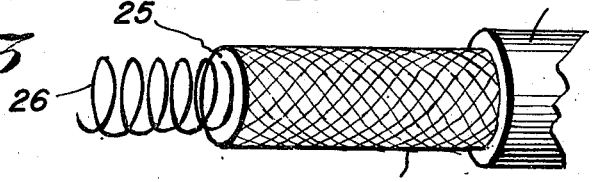
FIG. 3 is a braided cable detail.

Referring now to the drawings in detail, reference numeral 10 is a safety tire having a conventional tubeless valve stem 11 for inflating an inner air cell 12. Two tubeless valve stems 13, with cord reinforced flexible extensions, are provided for inflating air cells 14. The inner cell 12 is sealed by sealing beads bearing against the rim 15 and the outer bead of the tire. A tubeless valve stem 16, having a cord re-inforced rubber extension hose is provided for inflating cell 17. A twoply secondary safety wall 22 encloses air cell 12. Two flexible steel belts 18 are imbedded in the tire circumference and separated by center section 19. There is a vulcaniged portion 20 between spaced air cells 12 and 17 where the two walls join. A series of flexible steel cables are embedded in center section 19 around the tire center periphery. Tubeless pressure cell 17 functions to expand the center section 19 which in turn expands braided cable 23, thus forcing ice gripping studs 24 outward. Rubber cores 25 are enclosed in cables 23 and the rubber wall of section 19 encloses cables 23. A steel coiled spring 26 is provided in each core 25 to help collapse the center section 19 of the tire. The section 19 so formed, applied inward circumferential pressure against air cell 17. The section 19 will expand a pre-determined amount when the air pressure in cell 17 is increased via valve 16. Section 19 is normally biased to assume a concave condition shown in FIG. 1.

The tire also includes treads 27 on each side of section 19. There also are provided circumferential V notches 28 in the circumference of section 19. 29 shows 2 ply cord, and 30 and 31 show two ply bias cords.

Thus a new safety tire has been provided.

Figure 4:
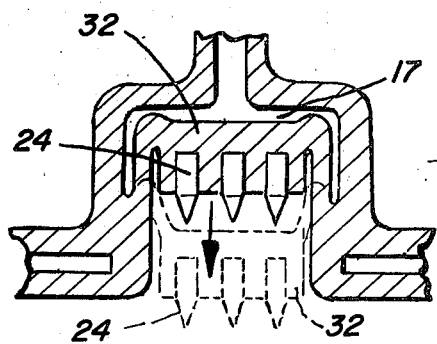
FIG. 4 is a modified design of the invention in which the tire section that carries the spikes or studs slides straight instead of flexing on an arc (as shown in FIGS. 1 and 2), and can therefore use stronger studs as a result for greater wheel traction, because the tire section being thicker is more stronger.

In FIG. 4 a modified design of the invention includes a tire section 32 that is slidable between the posistion shown by solid lines and position shown by dotted lines so that the section moves the studs 24 between a retracted and extended position. Section 32 moves outward responsive to changes in air pressure in cell 17.

While various changes may be made in the detail construction, it is understood that such changes will be within the spirit and scope of the present invention as is defined by the appended claims.

What is claimed is:

1. A safety tire comprising an outer casing and an inner tube mounted in said casing, wherein the inner tube is spaced from said casing forming inner and outer air cells, including a traction air cell formed peripherally in said outer casing symmetrical about a vertical plane passing through the center of said tire, wherein said tire has a peripheral thread having a relatively, flexible center section encompassing said traction air cell and stiff adjacent thread portions, including spring means embedded in said center sections biasing said center section radially inward to assume a normally concave position relative to the adjacent thread portions, including air valves for the inner and outer cells and a separate air valve for said traction cell, wherein said tube and casing are joined between the inner air cell and the center section to provide a center wall completing the enclosure of said traction air cell, whereby inflation of said traction air cell causes the outward movement of the center section to assume a convex position, in further combination with studs mounted on said center section and protruding outwardly therefrom.

2. A tire as in claim 1 wherein the spring means comprises a rubber core enclosing a coiled spring including beads on said inner tube engaging the tire rim for sealing purposes.

3. A tire as in claim 1 wherein the center section is U-shaped and is slidably fitted in a U-shaped peripheral depression formed in the casing including flexible side portions attached to said casing permitting radial inward and outward motion and wherein the depression provides the air cell.

* * * * *